(12) United States Patent
Meijer et al.

(10) Patent No.: US 7,779,397 B2
(45) Date of Patent: Aug. 17, 2010

(54) DATA INTERFACES

(75) Inventors: Henricus Johannes Maria Meijer, Mercer Island, WA (US); Amanda Silver, Seattle, WA (US); Paul A. Vick, Seattle, WA (US); Brian C. Beckman, Newcastle, WA (US)

(73) Assignee: Microsoft Corporation, Redmond, WA (US)

( * ) Notice: Subject to any disclaimer, the term of this patent is extended or adjusted under 35 U.S.C. 154(b) by 1356 days.

(21) Appl. No.: 11/214,404

(22) Filed: Aug. 29, 2005

(65) Prior Publication Data

US 2007/0094647 A1    Apr. 26, 2007

(51) Int. Cl.
*G06F 9/45* (2006.01)

(52) U.S. Cl. ............... 717/140; 717/136; 717/137; 717/141; 717/142; 717/143

(58) Field of Classification Search ............ 717/140, 717/136, 137, 141–143
See application file for complete search history.

(56) References Cited

U.S. PATENT DOCUMENTS

| | | | | |
|---|---|---|---|---|
| 5,659,751 A | * | 8/1997 | Heninger | 717/163 |
| 5,909,580 A | * | 6/1999 | Crelier et al. | 717/141 |
| 5,991,538 A | * | 11/1999 | Becker | 717/140 |
| 6,006,031 A | * | 12/1999 | Andrews et al. | 717/137 |
| 6,016,395 A | * | 1/2000 | Mohamed | 717/149 |
| 6,044,216 A | * | 3/2000 | Bhargava et al. | 717/114 |
| 6,138,269 A | * | 10/2000 | Ball et al. | 717/108 |
| 6,292,933 B1 | * | 9/2001 | Bahrs et al. | 717/107 |
| 6,637,020 B1 | * | 10/2003 | Hammond | 717/140 |
| 6,738,968 B1 | * | 5/2004 | Bosworth et al. | 717/157 |
| 6,981,249 B1 | * | 12/2005 | Knoblock et al. | 717/141 |
| 7,433,917 B2 | * | 10/2008 | Renaud | 717/164 |
| 2003/0018832 A1 | * | 1/2003 | Amirisetty et al. | 709/328 |
| 2006/0036935 A1 | * | 2/2006 | Warner et al. | 715/500 |

OTHER PUBLICATIONS

McClure, et al. "SQL DOM: Compile Time Checking of Dynamic SQL Statements", 2005, ACM, p. 88-96.*
Albano, et al. "A Strongly Typed, Interactive Object-oriented Database Programming Language", 1986, IEEE, p. 94-103.*

* cited by examiner

*Primary Examiner*—Wei Y Zhen
*Assistant Examiner*—Qamrun Nahar
(74) *Attorney, Agent, or Firm*—Workman Nydegger

(57) ABSTRACT

A computer-implemented system for accessing data stored in a computer-readable format comprises a data source indicator that identifies least one datum of a data source to be typed. The system also includes a type definition component that defines a strongly typed view of the at least one datum. Methods of using the system are also provided.

20 Claims, 13 Drawing Sheets

DATA INTERFACES

The present invention generally relates to the field of computing and data interfaces.

BACKGROUND

Computing systems increasingly must work with data from diverse sources. Often the data with which these systems must work is in a variety of different formats and representations. Although a large number of formats and representations exist, several major ways of representing data have evolved and become prevalent in modern computing environments. Each of these formats and representations has its own strengths and weaknesses. Choice among formats is a common problem encountered by software developers.

The relational data model makes it easy to query large amounts of information. However, this model does not allow for data that results from a query to be encapsulated. Additionally, relational data is not designed for transmission across the wire. The extensible markup language (XML) model of data representation makes it easy to transmit information across the wire, but is not designed to be encapsulated and is difficult to query. The object model of data is designed around encapsulation principles, but cannot be easily transmitted across the wire. Further, the object model usually offers no effective query capabilities. No single data model provides everything in one package. Most computing applications require using at least two, if not all three, data representation models.

Because each model by definition has a different way of representing data, when the format of represented data is converted from one model to another, a mapping between models usually must be created. Most programming languages do not provide a standard way to specify the mapping between the object model and either the relational or the XML model. Instead, each mapping system usually defines its own set of attributes or schema language to specify how data should map between the models.

Most programming languages also require, as part of the mapping, that the data be copied. Usually, when data is mapped from either the XML or relational model onto the object model, the data is transformed from the XML or relational representation into an object. As a result, the data is disconnected from its original representation because it has been fully encapsulated in an object. To preserve a connection between the object representation and the original representation, the encapsulating object must either include additional information that maintains the connection or an external component must track the connection between the object and its original data. Either approach means that the computer programmer or software developer is usually limited in how object representations are defined or the computer programmer or software developer must explicitly manage the relationship between the object representation and the original representation.

Copying data as part of a mapping also has performance implications. When working with large amounts of information, the requirement that data be shuttled back and forth from one representation to another is memory intensive, both in terms of object allocations and in terms of the basic amount of copying required. Current systems fail to provide an efficient way for data to be used across representation paradigms.

SUMMARY

The following presents a simplified summary in order to provide a basic understanding and high-level survey. This summary is not an extensive overview. It is neither intended to identify key or critical elements nor to delineate scope. The sole purpose of this summary is to present some concepts in a simplified form as a prelude to the more detailed description later presented. Additionally, section headings used herein are provided merely for convenience and should not be taken as limiting in any way.

A data interface provides a means to impose a strongly-typed view over untyped data. The data interface has a static type that can be erased during compilation procedures. Use of a data interface permits typecasting of data by declaring a first object in terms of a second object. Members of such an interface can be constrained with respect to their attributes such a default implementation can be assured.

A generic data interface can be imposed over data of arbitrary types by adding each of the arbitrary types to the generic interface. For an arbitrary type to be added, the type must implement a fixed, special, or reflection interface. When adding a type, a conversion from the generic interface to the type in terms of the fixed, special, or reflection interface that the type implements is provided. A user-defined interface can be used in place of either or both of the generic interface or the fixed, special, or reflection interface.

The disclosed and described components and methods comprise one or more of the features hereinafter described and particularly pointed out in the claims. The following description and the annexed drawings set forth in detail certain specific illustrative components and methods. However, these components and methods are indicative of but a few of the various ways in which the disclosed components and methods can be employed. Specific implementations of the disclosed and described components and methods can include some, many, or all of such components and methods, as well as their equivalents. Variations of the specific implementations and examples presented herein will become apparent from the following detailed description when considered in conjunction with the drawings.

DETAILED DESCRIPTION

Figure 1:
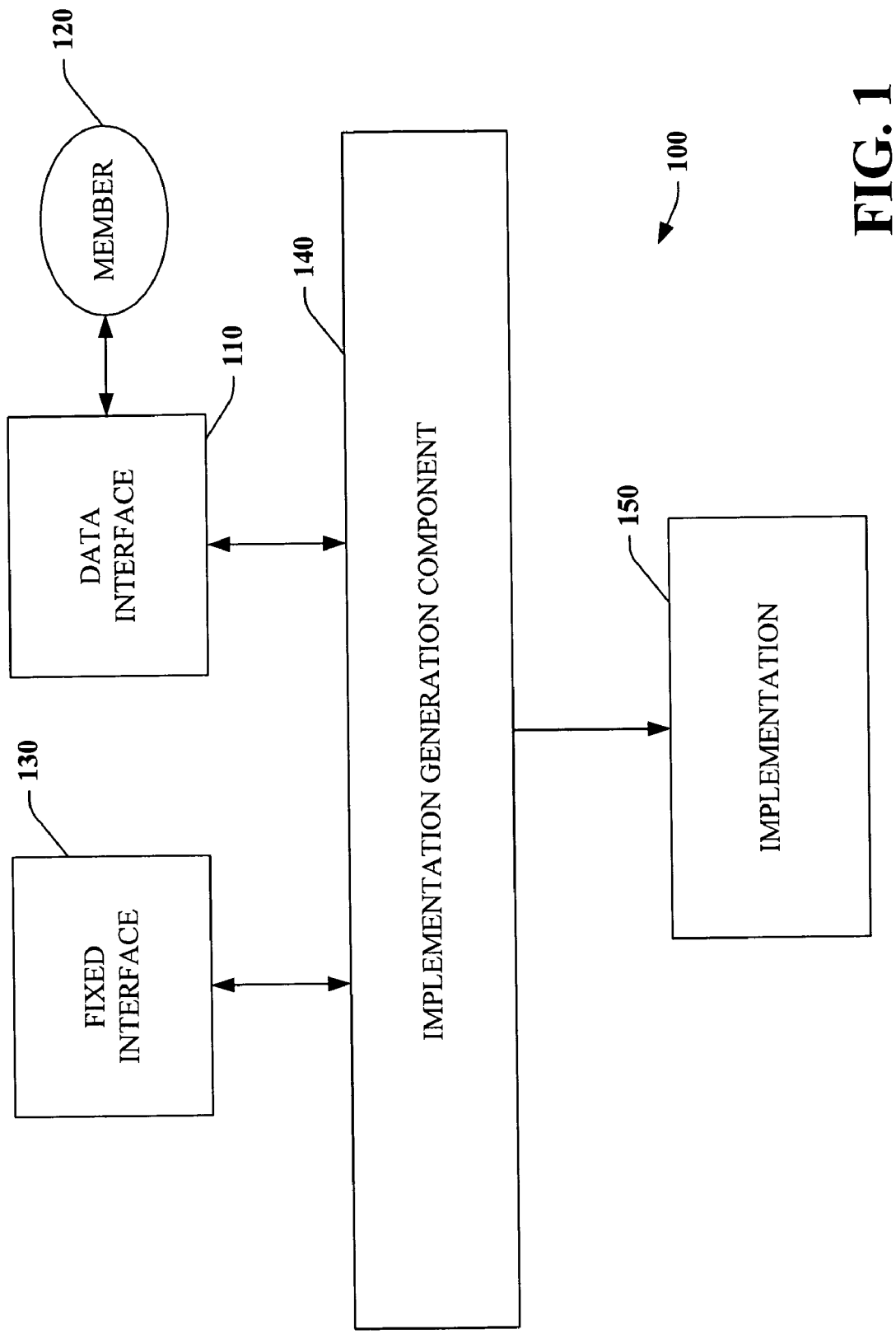
FIG. 1 is a system block diagram of a data interface system.

As used in this application, the terms "component," "system," "module," and the like are intended to refer to a computer-related entity, such as hardware, software (for instance, in execution), and/or firmware. For example, a component can be a process running on a processor, a processor, an object, an executable, a program, and/or a computer. Also, both an application running on a server and the server can be components. One or more components can reside within a process and a component can be localized on one computer and/or distributed between two or more computers.

Disclosed components and methods are described with reference to the drawings, wherein like reference numerals are used to refer to like elements throughout. In the following description, for purposes of explanation, numerous specific details are set forth in order to provide a thorough understanding of the disclosed subject matter. It may be evident, however, that certain of these specific details can be omitted or combined with others in a specific implementation. In other instances, certain structures and devices are shown in block diagram form in order to facilitate description. Additionally, although specific examples set forth may use terminology that is consistent with client/server architectures or may even be examples of client/server implementations, skilled artisans will appreciate that the roles of client and server may be reversed, that the disclosed and described components and methods are not limited to client/server architectures and may be readily adapted for use in other architectures, specifically including peer-to-peer (P2P) architectures, without departing from the spirit or scope of the disclosed and described components and methods. Further, it should be noted that although specific examples presented herein include or reference specific components, an implementation of the components and methods disclosed and described herein is not necessarily limited to those specific components and can be employed in other contexts as well.

It should also be appreciated that although specific examples presented may describe or depict systems or methods that are based upon components of personal computers, the use of components and methods disclosed and described herein is not limited to that domain. For example, the disclosed and described components and methods can be used in a distributed or network computing environment. Additionally or alternatively, the disclosed and described components and methods can be used on a single server accessed by multiple clients. Those of ordinary skill in the art will readily recognize that the disclosed and described components and methods can be used to create other components and execute other methods on a wide variety of computing devices.

FIG. 1 is a system block diagram of a data interface system 100. The data interface system 100 can be used to provide a strongly typed view of untyped data. Specifically, the data interface system 100 can be used to supply types for data in a well-formed XML document, or an object whose static type is unknown.

It should be noted that in examples presented with reference to this particular figure, as well as other figures throughout this document, code segments are used to further illustrate principles or concepts presented herein. Such code segments may resemble, or even be, XML code or source code written in pseudocode or a high-level programming language. Such examples are not intended to, and do not, imply that the systems, components, methods, principles, or concepts disclosed and described herein are limited to specifics of these examples. Those of ordinary skill in the art will recognize from reading this disclosure that other implementations, some of which can require some modifications that are within the ability of an ordinary skilled artisan, are possible and that the systems, components, methods, principles, or concepts disclosed and described herein have broad applicability.

The data interface system 100 includes a data interface 110. The data interface 110 can be a generic interface that can be created by a computer programmer or software engineer. The data interface 110 can also include one or more members 120. In an object-oriented implementation, a member can include a property, a method, or an object, among other things. In some specific examples, such as when a guaranteed implementation for a specific data interface 110 is desired, members can be restricted, such as only allowing properties as members of the data interface 110.

A fixed interface 130 is also part of the data interface system 100. The fixed interface 130 can be part of a high-level programming language, or a compiler for a high-level programming language, as necessary or appropriate depending upon context. The fixed interface 130 can be an interface that is implemented by some data type. For example, a data type that represents an XML element can be called XElement. The XElement type can implement a fixed interface for using data called ITuple. The data interface can be called IPoint. The XElement type can obtain information from an XML document that defines an element as some content nested between and opening text tag, such as <tag>, and a closing text tag, such as </tag>. In this example, and others building from or otherwise related to this example, the IPoint data interface can be used to work with information that describes a point in a Cartesian coordinate system, specifically in an x, y plane.

The data interface 110 can be used to supply a static type for data to be accessed. Specifically, the static type of the data interface 110 can be used when the dynamic interface 110 is imposed over some untyped datum. An implementation generation component 140 can use information about the data interface 110 and members 120 of the data interface 110, along with information about the fixed interface 130, to strongly type an underlying datum. One possible way of strongly typing the underlying datum is by taking an object that was declared in terms of the data interface 110 and using a conversion supplied by a member 120 of the data interface 110 to view the object in terms of the fixed interface 130.

The implementation generation component 140 can be a compiler for a high-level programming language or other programming language, a preprocessor, a precompiler, or some other appropriate or suitable component. Operation of the implementation generation component can result in the creation of an implementation 150. The implementation 150 can be a strongly-typed view of the originally untyped data.

The following exemplary code segments and associated discussion can further illustrate these concepts. Begin by taking the following XML-style (later referred-to for brevity and readability simply as XML) code:

```
<Point>
    <X> 5 </X>
    <Y> 7 </Y>
</Point>
```

This XML code can define a point in the previously described Cartesian coordinate system. To create an XML element in a high-level programming language, the following can be used:

```
Dim P As XElement =   <Point>
                          <X> 5 </X>
                          <Y> 7 </Y>
                      </Point>
```

This exemplary code can create an XElement object, P, that includes information from the original XML code. It should be noted that in this and other examples, late binding can be used. In such case, the code above can be written as:

```
Dim P =   <Point>
              <X> 5 </X>
              <Y> 7 </Y>
          </Point>
```

To access the value 5 from the X element, the following programming code can be used:

```
Dim X=P.X
```

In this code, the X child is selected as an XElement but does not have an assigned data type that can be tracked or manipulated. Because this exemplary code defines a point, the values of x and Y, 5 and 7 respectively, should be accessed as integers. These values can thus be viewed as having a type instead of simply as a fragment of XML code.

To view these values as having a type, a data interface, such as the data interface 130, can be defined. The following code shows an exemplary definition:

```
Data Interface IPoint
    Property X As Integer
    Property Y As Integer
End Interface
```

In this example, untyped data, the values 5 and 7 from the underlying XML code, is the starting or reference point. The data interface IPoint can define a contract or provide a type accessor that can be used to cast the untyped data to a specified type. Specifically, the IPoint data interface can be imposed as a view over the type to which the data has been cast. The members of the IPoint data interface, specifically the two Property members, provide explicit casts for values of both the X and Y elements from the XML code to type Integer. The data interface IPoint provides the translation from an XML fragment. In this case, a fragment can be some datum that is described by enclosing tags. The enclosing tags can include other enclosing tags. The data interface definition can provide an identification of an XML element property and a type to which a datum of the identified XML property is to be cast.

Consider the following exemplary code:

```
Dim Q As IPoint = P    // P has type
                       // XElement here.
Dim X2 As Integer = Q.X
```

This code can create X2 of type Integer which receives its value from an IPoint object Q that itself received a value from an untyped XElement. At compile time, data interface types, such as the IPoint type, can be erased. Following erasure procedures, only a static type will remain. In this instance, a conversion occurs from XElement to IPoint.

Erasure can be used to eliminate the static IPoint type. Only a compiler for the high level programming language will have information that object Q is declared as an IPoint object. To other components, object Q is seen as an XElement. The IPoint type is merely a means to impose the typed view.

Consider the following exemplary code:

```
Dim R As Integer( ) = {5, 7}
Dim S As IPoint = R    /*Assume conversion
                         from Integer( )to Ipoint*/
Dim X3 As Integer = S.X
Dim U As DataRow = new DataRow ("X", "Y", 5, 7)
Dim V As IPoint = U    /*Assume conversion
                         from DataRow( ) to IPoint*/
Dim X4 As Integer = U.X
```

Here, three different types are present. The view enabled by the data interface 130, such as the exemplary IPoint interface, can be imposed over all three types. A universal representation, DataRow, is untyped. For each of the three types presented, examine how the property is implemented. If an XElement is provided, to implement X, select the child, obtain the value of the child, and convert the obtained value to type Integer. For an array such as R that was created as Integer( ), to implement X, select the zero-th element of the array, obtain the value stored at that position of the array, and convert the obtained value to type Integer. To implement the DataRow, select the column named "x", get the value stored at that column position, and convert that value to type Integer.

To be able to implement this data interface with differing specific implementations so that the interface can be imposed over multiple types, it is possible to use an interface that the types already commonly implement. Once such an interface is identified, a generic interface can be defined in terms of that common fixed interface. A common interface that can be identified for these examples is ITuple. Additional types can be added to the generic interface so long as the type to be added implements the common interface ITuple. IPoint can be defined in terms of ITuple. Any type added to the generic interface that implements the common fixed interface can be defined in terms of the fixed interface.

In the exemplary implementation scheme described, the number of interfaces needed to be implemented can be managed so that a finite number of implementations is needed. Each of the lower types needs to implement an interface and the generic interface upper type needs to be able to call the implemented interface. An implementation can also specify that there is no inheritance relation from a generic interface to a fixed interface that is implemented by one of the lower types. For example, an implementation can specify that there is no inheritance from IPoint to ITuple. This inheritance limitation can be removed if desired in a particular implementation.

Any type that implements ITuple can be viewed as an instance of IPoint. Conversion code for the types can inserted by the compiler. The static IPoint type is erased. The remaining dynamic type was expressed in terms of the erased static type. The static type IPoint exists at compile time as a capsule for the conversion code. This conversion code is pasted into the generated code by the compiler. The static type disappears. In the sense of the language and the underlying machine, base types must implement a common interface. Data interfaces such as the ones described exist as constructs for a compiler. Implementations of members of the data interface are expressed in terms of members of a fixed interface.

In another possible implementation, a compiler can examine a type and a name and use that information to derive from a signature how to derive one property in terms of another property. An expressed-in implementation can be implicit from signatures of members in data interfaces. The implementation generation component 150, when constructed as a compiler, can use signatures to find matching expressions for derivations such as the ones previously disclosed and described herein.

When imposing in interface view over multiple types, the types over which the interface view is imposed must implement a common or special interface. In these examples, that interface is ITuple. Objects can be expressed in terms of ITuple. An object of some type implements a fixed interface. Implementation of the fixed interface is also fixed. In this manner, degrees of freedom can be limited when imposing an arbitrary view on an arbitrary type.

A fixed interface can be a reflection interface. This reflection interface can provide the ability to reflect over a type. Normally, reflection is a function that is part of a runtime environment. Providing a reflection interface allows a type to implement its own reflection. A fixed reflection-type interface can provide the ability to inspect a type. When a type implements this interface to obtain introspection of type and value, members of these data interfaces cab be restricted to have only properties to provide the case that a default implementation will be available. In the foregoing examples, when erasure occurs such erasure is to ITuple. With this scheme, the compiler, such as the implementation generation component 150, has a way at runtime to inspect types.

A default implementation can be obtained by following a pre-established procedure. First, a reflection interface can be used to get a member with a name specified by a signature. Next, a return type can be used to cast the result. A specified interface can be used to get a member with a specified name and a specified type from a signature to cast a result. In terms of the foregoing examples, the first-layer ITuple interface can inform how to access properties in a generic manner. The second-layer generic interface informs how to get strongly typed information from ITuple.

In this specific scheme, an early-bound layer is placed over a late-bound layer. This specific implementation can provide support for other or ancillary features such as additional type checking and intelligent code-creation functions. Such intelligent code-creation functions can be implemented with the assistance of artificial intelligence components such as expert systems, neural networks, rules-based processing components, or support vector machines (SVMs), among others. Specifically, an intelligent code-creation component can use classifiers to suggest code completions, can suggest typecasting, or can perform other useful functions.

A classifier is a function that maps an input attribute vector, $X=(x1, x2, x3, x4, \ldots xn)$, to a confidence that the input belongs to a class, that is, $f(X)=confidence(class)$. Such a classification can employ a probabilistic and/or statistical-based analysis (for example, factoring into the analysis utilities and costs) to prognose or infer an action that a user desires to be automatically performed. In the case of an end-user programming module, patterns of events can be classified to determine whether to take one or more specified actions. Other patter-matching tasks can also be employed as will be evident to an artisan of ordinary skill upon reading this disclosure.

An SVM is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, and probabilistic classification models providing different patterns of independence can be employed. Classification as used herein also includes statistical regression that is utilized to develop models of priority.

As will be readily appreciated from the subject specification, components disclosed or described herein can employ classifiers that are explicitly trained (for example, by a generic training data) as well as implicitly trained (for example, by observing user behavior, receiving extrinsic information). For example, SVMs are configured by a learning or training phase within a classifier constructor and feature selection module. Thus, the classifier(s) can be used to automatically perform a number of functions including but not limited to making coding suggestions or identifying coding errors, as well as assisting during compilation of source code.

Another example of the use of data interfaces follows. A data interface can be declared in the same way a regular interface is declared, with the following restrictions: the modifier Data must be come before the Interface keyword, the interface can only contain properties, and a data interface cannot inherit from a regular interface, and vice versa. Note in this example, Data is not a reserved word. Additionally, properties in a data interface cannot have index parameters. The following are some example data interfaces:

```
Data Interface Point
    Property X( ) As Integer
    Property Y( ) As Integer
End Interface
Data Interface Customer
    Property Name( ) As String
    Property Phone( ) As String
End Interface
Data Interface Employee
    Inherits Customer
    Property Address( ) As Address
End Data Interface
Data Interface Address
    Property Street( ) As String
    Property City( ) As String
    Property State( ) As String
    Property ZIP( ) As Integer
End Interface
```

Data interfaces, like regular interfaces, can have reference, rather than value, semantics. Assigning one data interface to another copies a reference to the source data interface instead of copying the value of the source data interface into the destination data interface. For example, the following code does not modify the original object:

```
Module Test
    Sub Main( )
        Dim t1 As Customer = GetCustomer("Bob")
        Dim t2 As Customer = GetCustomer("Alice")
        t1 = t2
    End Sub
End Module
```

To modify the original data interface, the individual fields can be assigned values:

```
Module Test
    Sub Main( )
        Dim t1 As Customer = GetCustomer("Bob")
        Dim t2 As Customer = GetCustomer("Alice")
        With t1
            .Name = t2.Name
            .Phone = t2.Phone
        End With
    End Sub
End Module
```

Data interfaces can be used anywhere a type name is allowed, with the exception that Declare statements cannot refer to data interfaces.

```
InterfaceDeclaration ::=
    [ Attributes ]  [ TypeModifier+ ]  [
Data ]  Interface  Identifier  [
TypeParameterList ]
        StatementTerminator
    [ InterfaceBase+ ]
    [ InterfaceMemberDeclaration+ ]
    End  Interface  StatementTerminator
```

Data interfaces can contain a special member called the value member. The value member can be represented by the character * and can represent all of the elements in the data interface (the value of the data interface) but not the data interface itself. The type of the value member is the data interface type, but the value member can only appear on the left hand side of the assignment statement and in the select list of a Select expression. The value member cannot be qualified.

The value member can be used in assignment statements to assign a set of values to a data interface instead of changing its reference. When the value member is the target of an assignment, the value of the data interface is modified rather than the reference to the data interface. For example:

```
Module Test
    Sub Main( )
        Dim t1, t2 As Customer
        t1.* = new Values {Name:="Bob Smith",
Phone:="(206) 555-1212"}
        ' Copies the value, instead of copying the
reference
        t2.* = t1
        ' Modifies only the original customer
value
        t1.Name = "John Smith"
        ' Prints "Bob Smith" because t2 is a copy
        Console.WriteLine(t2.Name)
    End Sub
End Module
```

Data containers that can have data interfaces imposed on them can be referred to as tuples. A tuple can be an instance of a class that can support a data interface. A type can become a tuple type by implementing the ITuple interface. When a program accesses a property in a data interface, this access can be converted into a call to the ITuple interface to retrieve the value from the type. For example, the code:

```
Module Test
    Function GetPoint( ) As Point
        . . .
    End Function
    Sub Main( )
        Dim p As Point
        p = GetPoint( )
        Console.WriteLine(p.X & "," & p.Y)
    End Sub
End Module
``` is equivalent to:

```
Module Test
    Function GetPoint( ) As ITuple
        . . .
    End Function
    Sub Main( )
        Dim p As ITuple
        p = GetPoint( )
        Console.WriteLine(p.GetValue(Of
Integer) ("X") & "," & _
                p.GetValue(Of Integer) ("Y"))
    End Sub
End Module
```

The class Values can define a general data container that can also be a tuple type. The Values type can be used to expose a set of values as a data interface. For example:

```
Module Test
    Sub PrintPoint(ByVal p As Point)
        Console.WriteLine(p.X & "," & p.Y)
    End Sub
    Sub Main( )
        Dim p As Point = New Values { X := 10, Y
:= 20 }
        PrintPoint(p)
    End Sub
End Module
```

In general, conversions between data interfaces and non-data interfaces can be treated as if the data interface were instead ITuple. Data interfaces can also define the following conversions. A widening conversion from a data interface to the ITuple interface and a narrowing conversion from the ITuple interface to a data interface. For example:

```
Module Test
    Sub Main( )
        Dim p As Point = GetPoint( )
        Dim t As ITuple
        t = p
        Console.WriteLine(t!X)
    End Sub
End Module
```

There is a widening conversion between two equivalent data interfaces or between a data interface and an encompassing data interface. If this is not the case, conversions between two data interfaces are narrowing.

Two data interfaces can be considered equivalent if every property in one data interface has a corresponding property in the other data interface with the same name and data type. A data interface A can be considered to be encompassed by another data interface B if A is equivalent to B, considering only the properties in A. If data interface A is encompassed by data interface B, then data interface B is considered to be encompassing data interface A. In the following example, the FullCustomer data interface encompasses SmallCustomer because the overlapping elements of the two data interfaces are equivalent:

```
Data Interface FullCustomer
    Property Name( ) As String
    Property Phone( ) As String
    Property Address( ) As String
End Interface
Data Interface SmallCustomer
    Property Name( ) As String
End Interface
Module Test
    Sub Main( )
        Dim x As FullCustomer = GetCustomer( )
        Dim y As SmallCustomer
        ' Widening conversion, FullCustomer
encompasses SmallCustomer
        y = x
        ' Narrowing conversion
        x = CType(y, FullCustomer)
    End Sub
End Module
```

It should be noted that as with regular interfaces converting a tuple type to a particular data interface or from one data interface type to another does not provide any static compile-time guarantees that the conversion will succeed at run-time. If a tuple type is converted to a data interface but does not contain a particular data member on that interface, accessing that member can cause a run-time exception. There can be situations where it is possible to statically determine whether a conversion will succeed, for example, the result of a query without a * operator. Checking can be extended in such cases.

Data interfaces can be analogous to regular interfaces in the sense that a data interface can be implemented such that it lacks an intrinsic identity. A tuple type can be considered to be its original type even when converted to a data interface type. For example, if the Location structure implements the Point data interface, the following code will print out Location, not Point:

```
Module Test
    Sub Main( )
        Dim x As Location = GetLocation( )
        Dim y As Point = x
        ' Prints out "Location"
        Console.WriteLine(y.GetType( ).ToString( ))
    End Sub
End Module
```

Similarly, the Is operator can determine whether underlying instances of a data interface are the same:

```
Function AreTheSameTuple(ByVal p1 As Point, ByVal p2
As Point)
    Return p1 Is p2
End Function
```

However, a value can be tested to see whether it is compatible with a particular data interface using TypeOf . . . Is:

```
Module Test
    Sub Main( )
        Dim x As Location = GetLocation( )
        If TypeOf x Is Point Then
            Console.WriteLine("Compatible")
        End If
    End Sub
End Module
```

Instead of implementing ITuple, a type can become a tuple type by implementing a data interface:

```
Data Interface Point
    Property X( ) As Integer
    Property Y( ) As Integer
End Interface
Class Location
    Implements Point
    Public Property XLocation( ) As Integer
    Implements Point.X
        . . .
    End Property
    Public Property YLocation( ) As Integer
    Implements Point.Y
        . . .
    End Property
End Class
Module Test
    Sub Main( )
        Dim s As New Location( )
        Dim p As Point
        s.XLocation = 10
        s.YLocation = 20
        p = s
        p.X = 30
        p.Y = 40
    End Sub
End Module
```

When a type implements a data interface, an automatic implementation of ITuple can be provided for the particular data interface mapping. It should be noted that a type can still choose to implement ITuple directly if desired to provide a dynamic data interface. A type can be restricted to implement only one data interface (or ITuple).

A type that implements a data interface type can have a widening conversion to the data interface type and a narrowing conversion from the data interface type. When the type is a value type, a conversion to or from a data interface type can copy a value in the type, as the value type must be boxed or unboxed when cast to or from ITuple. When the type is a reference type, a conversion to or from a data interface type can copy a reference to the tuple type.

Data interfaces cannot be directly emitted into assembly metadata. Instead, a data interface can be emitted into metadata as a regular interface. The data interface:

```
Public Data Interface Point
    Property X( ) As Integer
    Property Y( ) As Integer
End Interface
``` can be emitted as:

```
<DataInterface> _
Public Interface Point
    Property X( ) As Integer
    Property Y( ) As Integer
End Interface
```

As previously disclosed and described, when a type implements a data interface the type actually can implement ITuple instead of the data interface. For example:

```
Class MyCustomer
    Implements Customer
    ...
End Class
``` can be emitted as:

```
<DataInterfaceImplemented("Customer") > _
Class MyCustomer
    Implements ITuple
    ...
End Class
```

References to a data interface can be emitted as references to the ITuple with an optional custom modifier that can refers to the interface emitted for the data interface. This means that in some implementations, the method:

```
Public Sub MoveTo(ByVal x As Point)
    ...
End Sub
``` can appear as:

```
Public Sub MoveTo(ByVal x As ITuple)
    ...
End Sub
```

Thus, from an external perspective, the data interface type can be erased in favor of the ITuple interface. Although the compiler will see data interfaces, other components will only see ITuple. Another implication of type erasure is that a GetType type expression on a data interface type will return the System.Type object for ITuple, not the data interface.

The ISchema interface can be used to inspect the schema of a tuple at runtime. It should be noted that this interface can be defined separately from ITuple so that schema information can be provided separately from a tuple instance.

```
Public Interface ISchema
    ReadOnly Property Name( ) As String
    ReadOnly Property FieldCount( ) As Integer
    Function GetDataTypeName(ByVal index As
```

Integer) As String
    Function GetFieldType(ByVal index As Integer)
As System.Type
    Function GetName(ByVal index As Integer) As
String
    Function GetOrdinal(ByVal name As String) As
Integer
End Interface The members of the ISchema interface can be defined as follows. ReadOnly Property Name( ) As String can return the name of the schema, if any. It can return Nothing if the schema has no name. ReadOnly Property FieldCount( ) As Integer can return the number of fields in the schema. Function GetDataTypeName(ByVal index As Integer) As String can return the name of the data type of the specified field. Function GetFieldType(ByVal index As Integer) As System.Type can return the data type of the specified field. Function GetName (ByVal index As Integer) As String can return the name of the specified field. Function GetIsReadOnly(ByVal index As Integer) As Boolean can return whether the specified field is read-only. Function GetOrdinal(ByVal name As String) As Integer can return the index of the specified field name, −1 otherwise.

The ITuple interface can define methods used to access the values of a tuple.

```
Public Interface ITuple
    Inherits ISchema
    Default Property Item(ByVal index As Integer) As Object
    Default Property Item(ByVal name As String) As Object
    Function GetBytes(ByVal i As Integer, ByVal fieldOffset
As Long, _
        ByVal buffer( ) As Byte, ByVal bufferOffset As
Integer, _
        ByVal length As Integer) As Long
    Function GetChars(ByVal i As Integer, ByVal fieldOffset
As Long, _
        ByVal buffer( ) As Char, ByVal bufferOffset As
Integer, _
        ByVal length As Integer) As Long
    Function GetValue(Of T) (ByVal i As Integer) As T
    Function GetValues(ByVal values( ) As Object) As Integer
    Sub SetBytes(ByVal i As Integer, ByVal fieldOffset As
Long, _
        ByVal buffer( ) As Byte, ByVal bufferOffset As
Integer, _
        ByVal length As Integer)
    Sub SetChars(ByVal i As Integer, ByVal fieldoffset As
Long, _
        ByVal buffer( ) As Char, ByVal bufferOffset As
Integer, _
        ByVal length As Integer)
    Sub SetValue(Of T) (ByVal i As Integer, ByVal value As T)
    Sub SetValues(ByVal values( ) As Object)
    Function GetIsDBNull(ByVal i As Integer) As Boolean
    Sub SetIsDBNull(ByVal i As Integer)
End Interface
```

The members are defined as follows. Default ReadOnly Property Item(ByVal index As Integer) As Object can return the field corresponding to the specified index. Default ReadOnly Property Item(ByVal name As String) As Object can return the field corresponding to the specified field name. Function GetBytes(ByVal i As Integer, ByVal fieldOffset As Long, ByVal buffer( ) As Byte, ByVal bufferOffset As Integer, ByVal length As Integer) As Long can retrieve the specified bytes from the field. It can also return the number of bytes retrieved. Function GetChars(ByVal i As Integer, ByVal field- Offset As Long, ByVal buffer( ) As Char, ByVal bufferOffset As Integer, ByVal length As Integer) As Long can retrieve the specified characters from the field. It can also return the number of bytes retrieved.

Function GetValue(Of T) (ByVal i As Integer) As T can return the field corresponding to the specified index typed as a specific type. Function GetValues(ByVal values( ) As Object) As Integer can retrieve the fields of the tuple into an array and the number of fields in the array. Sub SetBytes (ByVal i As Integer, ByVal fieldOffset As Long, ByVal buffer( ) As Byte, ByVal bufferOffset As Integer, ByVal length As Integer) can set the specified bytes of the field.

Sub SetChars(ByVal i As Integer, ByVal fieldOffset As Long, ByVal buffer( ) As Char, ByVal bufferOffset As Integer, ByVal length As Integer) can set the specified characters of the field. Sub SetValue(Of T) (ByVal i As Integer, ByVal value As Object) can set the field corresponding to the specified index typed as a specific type. Sub SetValues(ByVal values( ) As Object) can set the fields of the tuple from an array. Function GetIsDBNull(ByVal i As Integer) As Boolean can retrieve whether the field is null. Sub SetIsDBNull(ByVal i As Integer) can set the fields to null.

The class Values can define a general data container that is also a tuple type.

---
Public Class Values
    Implements ITuple
End Class

---

Figure 2:
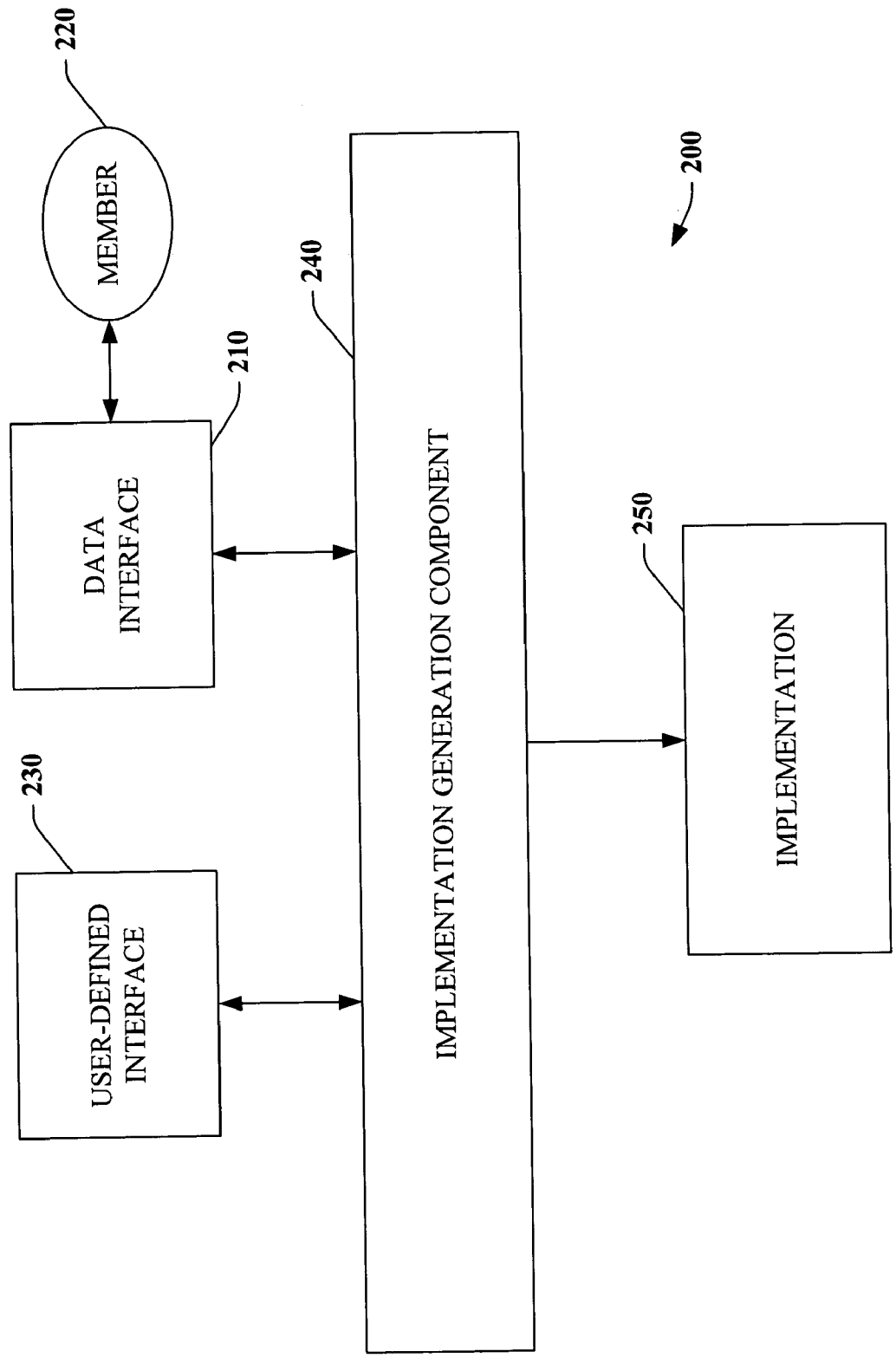
FIG. 2 is a system block diagram of a data interface system.

FIG. 2 is a system block diagram of a data interface system 200. The data interface system 200 can be used to provide a strongly typed view of untyped data. Specifically, the data interface system 200 can be used to supply types for data in a well-formed XML document through use of a data interface in conjunction with a user-defined interface.

The data interface system 200 includes a data interface 210. The data interface 210 can be a generic interface that can be created by a computer programmer or software engineer. Specifically, the data interface 210 can be any of the data interfaces previously disclosed or discussed in conjunction with FIG. 1. The data interface 110 can include one or more members 220. As with one of the examples previously presented, in an object-oriented implementation, a member 220 of the data interface 210 can include a property, a method, or an object, among other things. Additionally or alternatively, members such as the member 220 can be restricted, such as only allowing properties as members of the data interface 210.

A user-defined interface 230 is also part of the data interface system 200. The user-defined interface 230 can be created by a computer programmer or a software developer using a high-level programming language. The user-defined interface 230 can be an interface that is implemented by some data type as previously described.

The data interface 210 can be used to supply a static type for data to be accessed. Specifically, the static type of the data interface 210 can be used when the dynamic interface 210 is imposed over some untyped datum. An implementation generation component 240 can use information about the data interface 210 and members 220 of the data interface 210, along with information about the user-defined interface 230, to strongly type an underlying datum in a similar fashion to that previously described with fixed interfaces.

The implementation generation component 240 can be a compiler for a high-level programming language or other programming language, a preprocessor, a precompiler, or some other appropriate or suitable component. Operation of the implementation generation component can result in the creation of an implementation 250. The implementation 250 can be a strongly-typed view of the originally untyped data.

Figure 3:
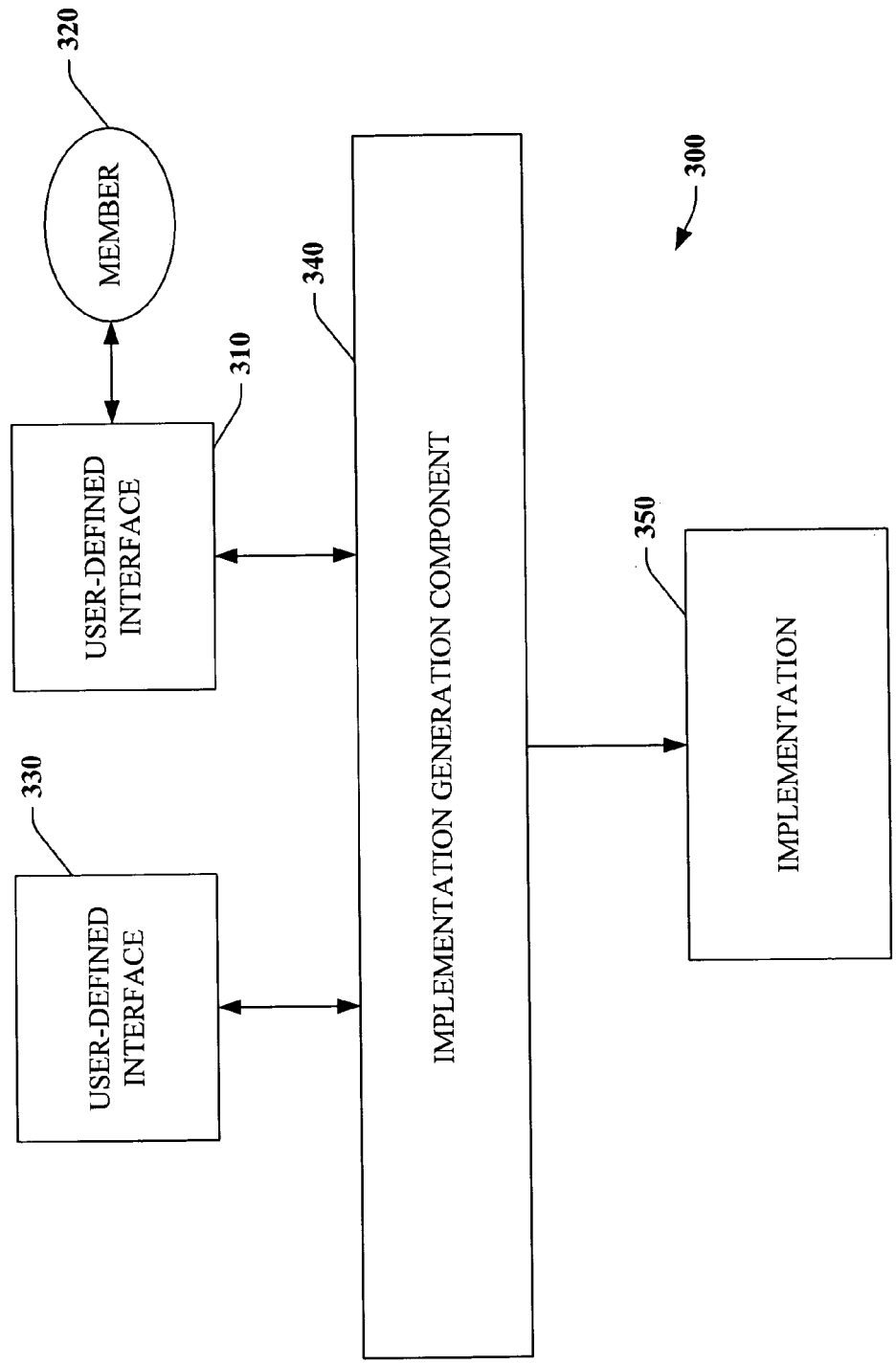
FIG. 3 is a system block diagram of a data interface system.

FIG. 3 is a system block diagram of a data interface system 300. The data interface system 300 can be used to provide a strongly typed view of untyped data. Specifically, the data interface system 300 can be used to supply types for data in a well-formed XML document, or untyped objects through use of two user-defined interfaces.

The data interface system 300 includes a first user-defined interface 310 and a second user-defined interface 320. Each of the user-defined interfaces 310, 320 can be created by a computer programmer or software engineer using a high-level programming language. Specifically, the user-defined interfaces 310, 320 can be constructed in accordance with principles set out previously such that one of the user-defined interfaces 310, 320 can be used to view data in terms of the other user-defined interface 310 or 320, as appropriate.

In this example, the user-defined interface 310 can be used to supply a static type for data to be accessed. Specifically, the static type of the user-defined interface 310 can be used when the dynamic interface 310 is imposed over some untyped datum. An implementation generation component 330 can use information about the data interface 310, along with information about the user-defined interface 320, to strongly type an underlying datum in a similar fashion to that previously described.

The implementation generation component 330 can be a compiler for a high-level programming language or other programming language, a preprocessor, a precompiler, or some other appropriate or suitable component. Operation of the implementation generation component can result in the creation of an implementation 340. The implementation 340 can be a strongly-typed view of the originally untyped data.

Figure 4:
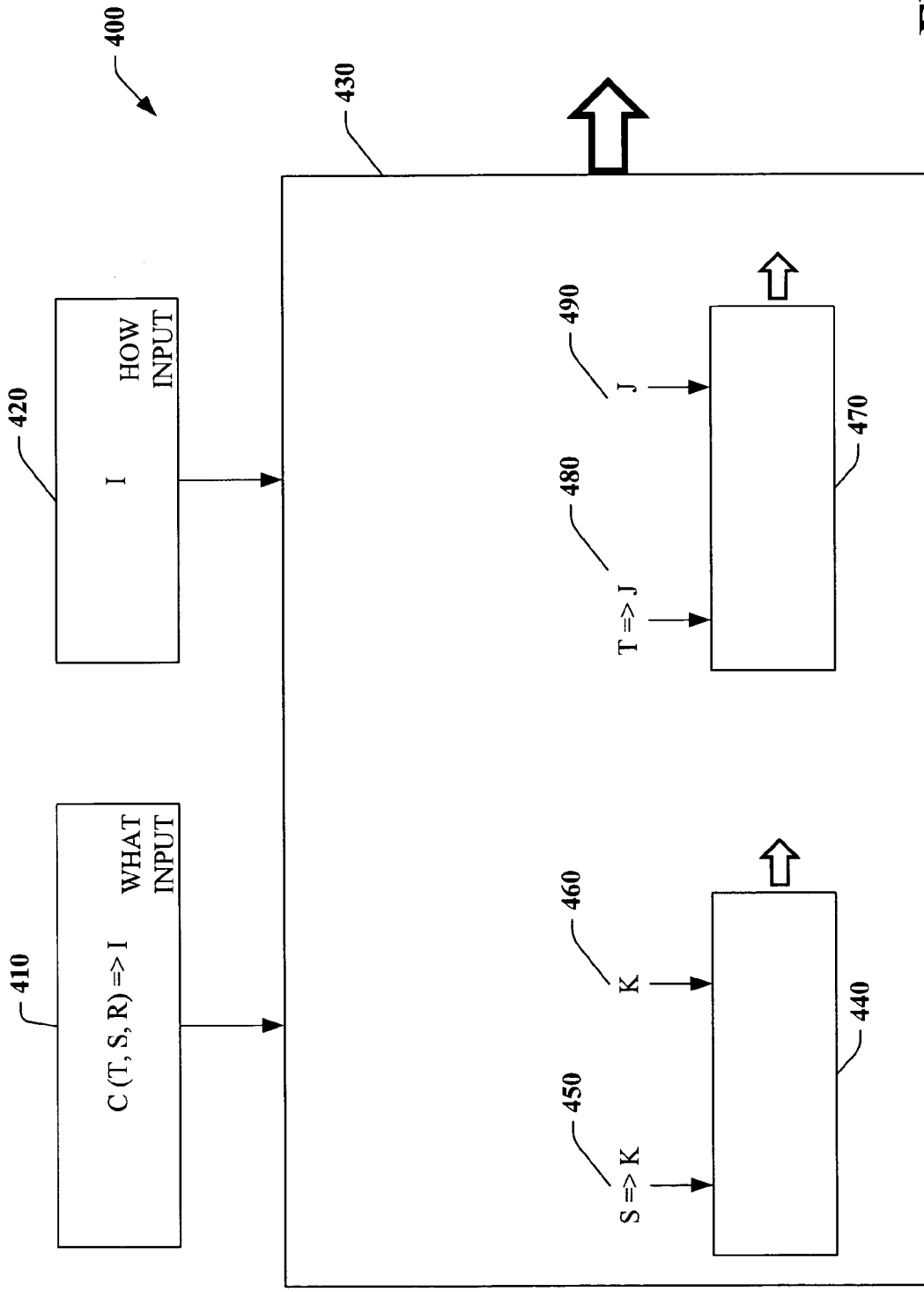
FIG. 4 is a system block diagram of a composable data interface system.

FIG. 4 is a system block diagram of a composable data interface system 400. The composable data interface system 400 can be used to create strongly-typed views of untyped data. Specifically, the composable data interface system 400 can take a pair of inputs and produce an output to transform a data type.

The composable data interface system 400 includes a first input 410. The first input 410 includes information regarding what output is to be created. A constructed type C can be defined to accept inputs T, S, and R. This constructed type can implement a data interface I. A second input 420 includes information about data interface I. This second input 420 can supply details regarding how data interface I is implemented.

A construction module 430 can use the first input 410 and the second input 420 to construct an implementation that results in a desired type cast. To do so, the construction module 430 can use a first sub-module 440 that has a first input 450 and a second input 460 along with a second sub-module 470 that has a first input 480 and a second input 490 to create a mapping that results in the desired type cast. Inputs of the first sub-module 440 and the second sub-module 470 correspond to inputs 410, 420 of the construction module 430. Specifically, inputs 450, 480 of sub-modules 440, 470, respectively correspond to input 410 of the construction module 430. Similarly, inputs 460, 490 of sub-modules 440, 470, respectively correspond to input 420 of the construction module 430. Thus, the construction module 430 and sub-modules 440, 470 each have one "what" input and one "how" input.

Consultation arrows from sub-modules 440, 470 and construction module 430 indicate that the respective components can communicate with other appropriate components, such as a reflection interface, to create a mapping. Such creation can be in accordance with techniques described earlier in conjunction with other figures. It should be noted that in this system, the composable data interface system 400 can itself be used as a sub-module of another the composable data interface system to assist in the creation of a mapping.

Figure 5:
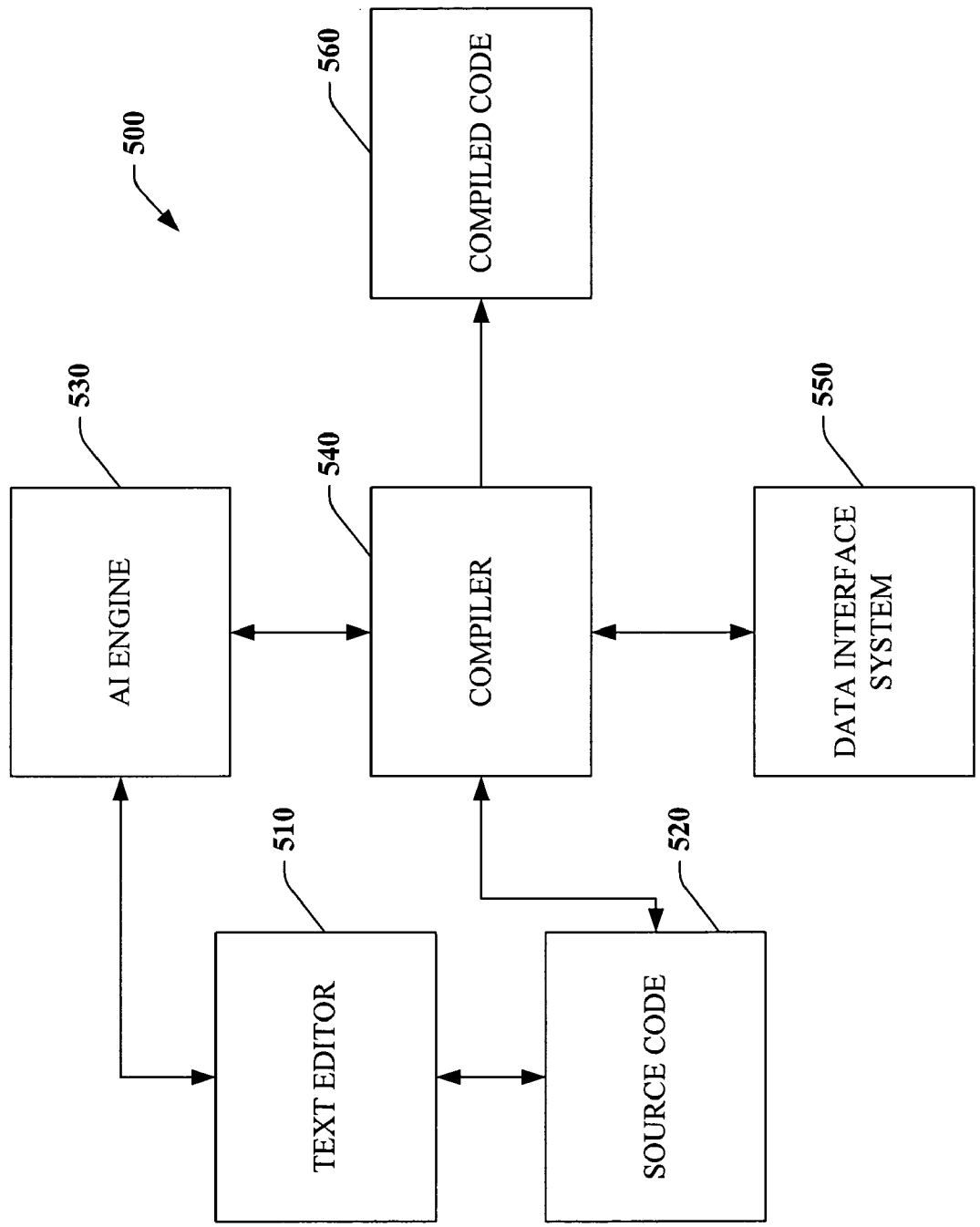
FIG. 5 is a system block diagram of a software development system.

FIG. 5 is a system block diagram of a software development system 500. The software development system can be used to create software that accesses untyped data. Specifically, software created by the software development system 500 can use strongly typed views of untyped data provided by data interfaces.

The software development system 500 includes a text editor 510. The text editor 510 can be any suitable text editor that can work with text that can be presented to another component for conversion into machine-executable code. The text editor can be used to create source code 520. The source code 520 can be human-readable text in a high level programming language.

An artificial intelligence engine 530 can provide supplemental functions for the text editor 510 when the text editor 510 is used to create source code 520. For example, the artificial intelligence engine 530 can provide syntax highlighting, code completion suggestions, type casting suggestions, or a host of various other functions. The artificial intelligence engine 530 can be implemented as a an expert system, a neural network, an SVM, or another suitable component.

A compiler 540 can access the source code 520 to translate the source code 520 into machine-executable software. As part of the translation process, the compiler 540 can access a data interface system 550 to make use of data interfaces of the type previously disclosed and described in conjunction with other figures. Additionally, if desired in a specific implementation, the artificial intelligence engine 530 can assist the compiler in code optimization or other functions. Compiled code 560 can include code that uses a strongly typed view of untyped data as part of its function.

With reference to FIGS. 6-11, flowcharts in accordance with various methods or procedures are presented. While, for purposes of simplicity of explanation, the one or more methodologies shown herein, for example, in the form of a flow chart, are shown and described as a series of acts, it is to be understood and appreciated that neither the illustrated and described methods and procedures nor any components with which such methods or procedures can be used are necessarily limited by the order of acts, as some acts may occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology or procedure.

Figure 6:
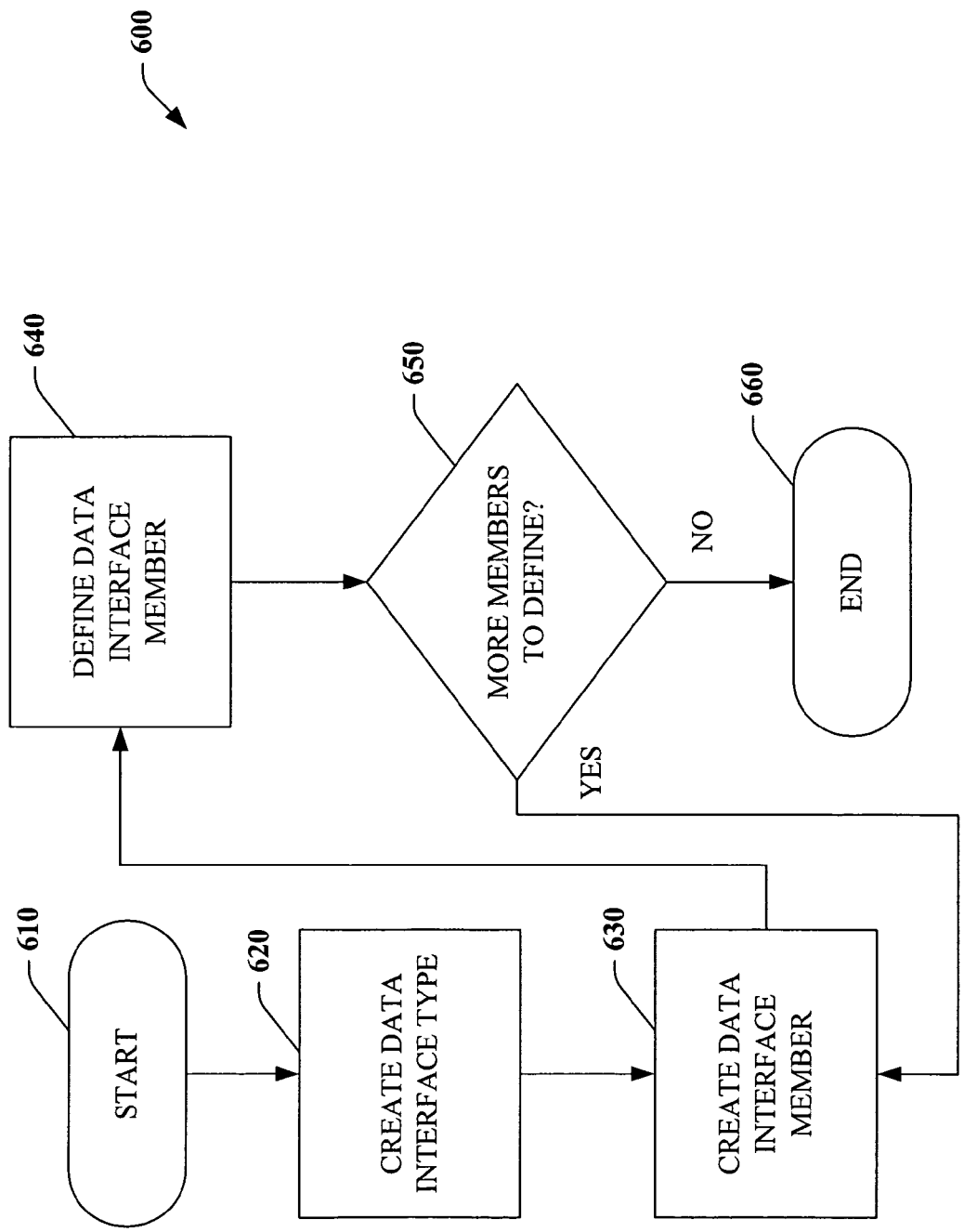
FIG. 6 is a flow diagram depicting a general processing flow of a method that can be employed in accordance with components that are disclosed and described herein.

FIG. 6 is a flow diagram of a method 600 that can be employed in conjunction with systems and components disclosed or described herein. The flow diagram depicts a method 600 of creating a data interface. The data interface can be used to manage data for use in software much as previously disclosed and described in conjunction with other figures. Specifically, the data interface can be used to provide a strongly typed view of untyped data in the manners discussed herein.

Processing of the method 600 begins at START block 610 and continues to process block 620. At process block 620, a data interface type is created. Processing continues to process block 630 where a member of the newly-created data interface is created. Details of this member are defined in accordance with any constraints applicable for a specific implementation at process block 640.

The method 600 continues processing at decision block 650. At decision block 650, a determination is made whether more members of the data interface remain to be defined. If this determination is yes, processing returns to process block 640. If the determination made at decision block 650 is no, processing concludes at END block 660.

Figure 7:
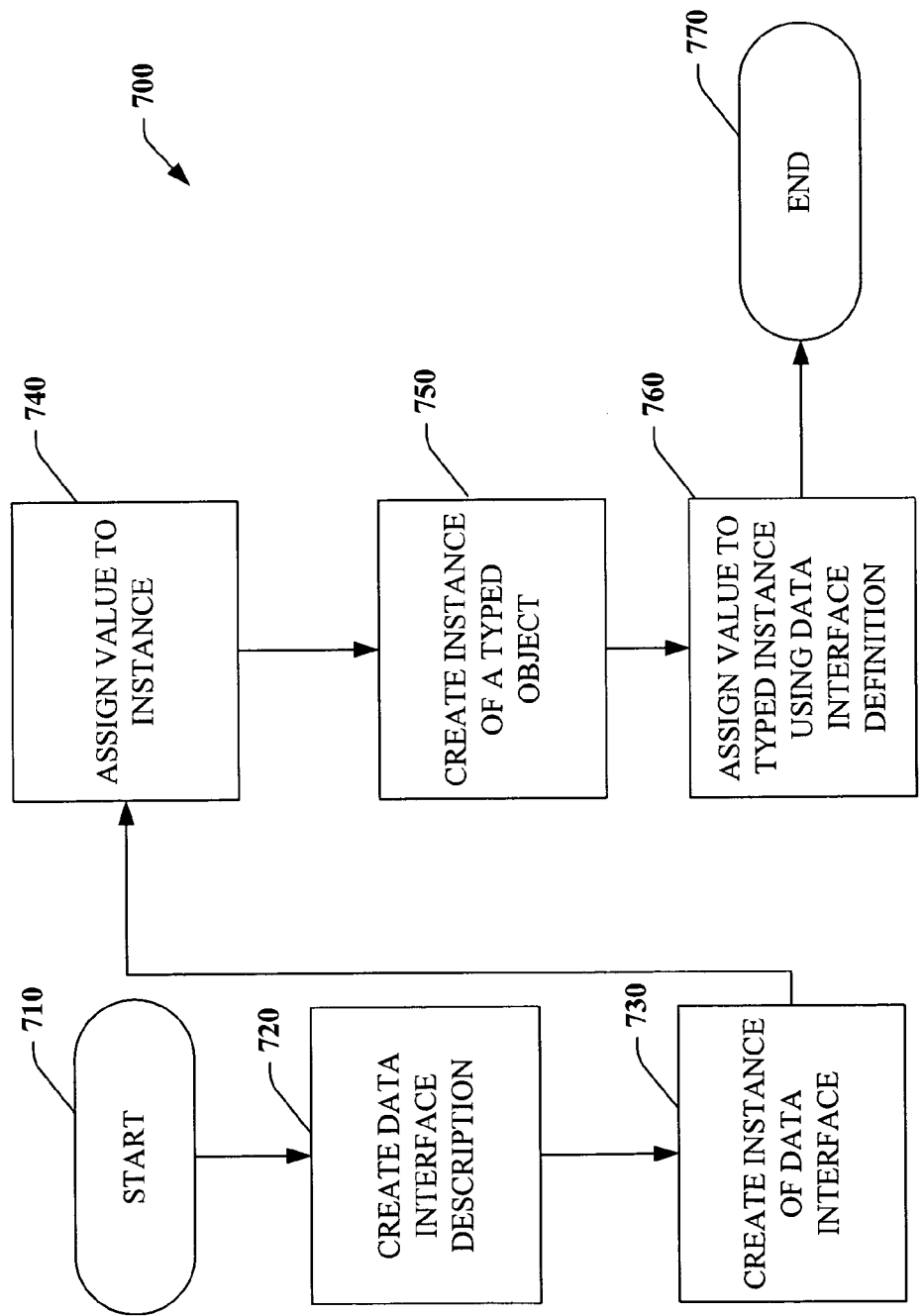
FIG. 7 is a flow diagram depicting a general processing flow of a method that can be employed in accordance with components that are disclosed and described herein.

FIG. 7 is a flow diagram of a method 700 that can be employed in conjunction with systems and components disclosed or described herein. The flow diagram depicts a method 700 of using a data interface. Specifically, the data interface can be used for providing a strongly typed view of untyped data in the manners discussed herein.

Processing of the method 700 begins at START block 710 and continues to process block 720. At process block 720, a data interface, such as any of the data interfaces previously disclosed and described herein, is created. Processing continues to process block 730 where an instance of the newly-created data interface is created. This instance object has a dynamic type. At process block 740, a value is assigned to this instance.

The method 700 continues processing at process block 750. At process block 750, an instance of some type T is created. Processing of the method 700 continues at process block 760 where a value is assigned to the type T in accordance with the data interface. Processing concludes at END block 760.

Figure 8:
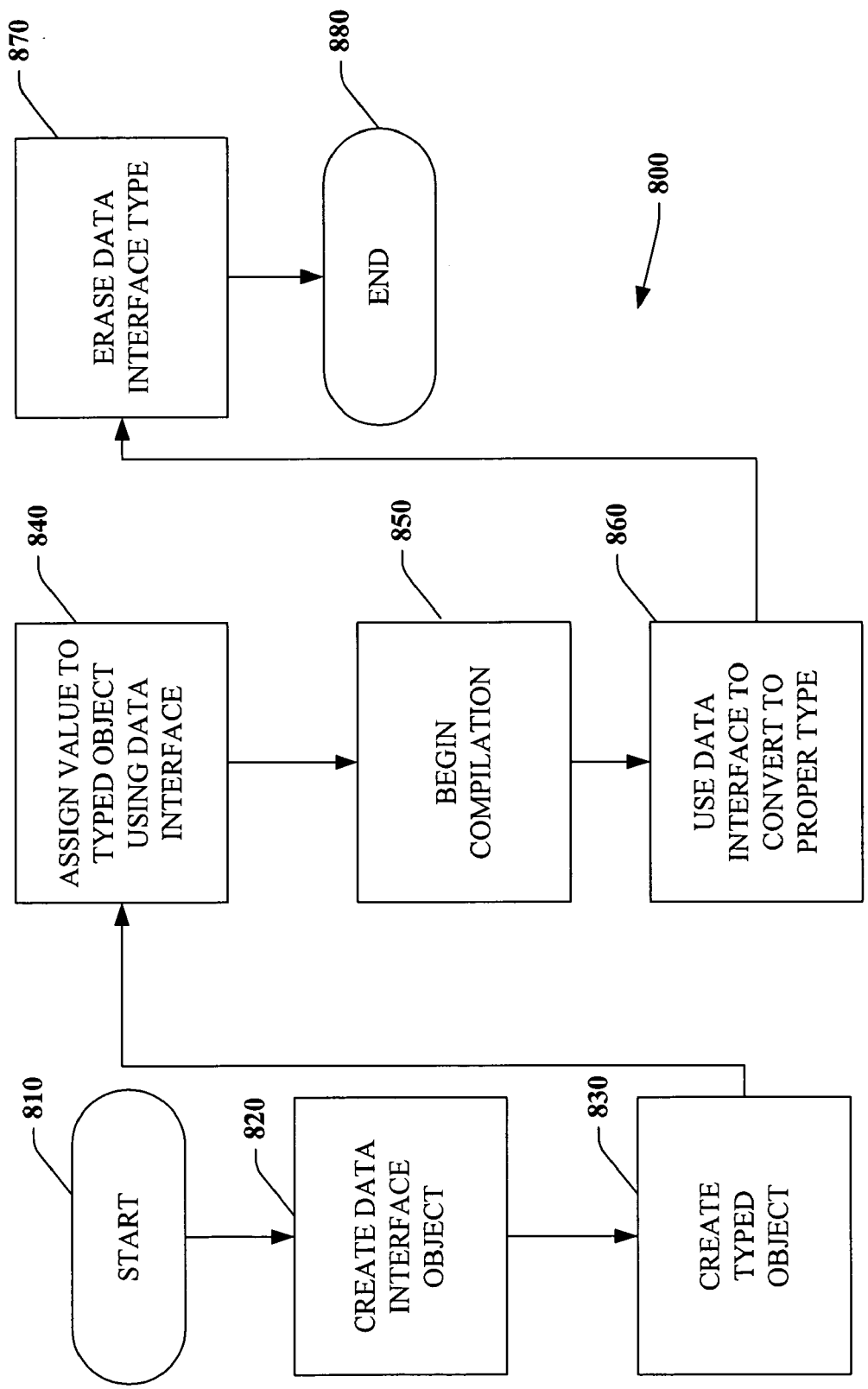
FIG. 8 is a flow diagram depicting a general processing flow of a method that can be employed in accordance with components that are disclosed and described herein.

FIG. 8 is a flow diagram of a method 800 that can be employed in conjunction with systems and components disclosed or described herein. The flow diagram depicts a method 800 of using a data interface. Specifically, the data interface can be used for providing a strongly typed view of untyped data in the manners discussed herein.

Processing of the method 800 begins at START block 810 and continues to process block 820. At process block 820, a data interface, such as any of the data interfaces previously disclosed and described herein, is created. Processing continues to process block 830 where a typed object is created. At process block 840, a value is assigned to this typed object using the data interface.

The method 800 continues processing at process block 850. At process block 850, compilation of software code begins. At process block 860, definitions provided by the data interface are used by a compiler to typecast to a static type. At process block 870, a static type of the data interface is erased. Processing concludes at END block 880.

Figure 9:
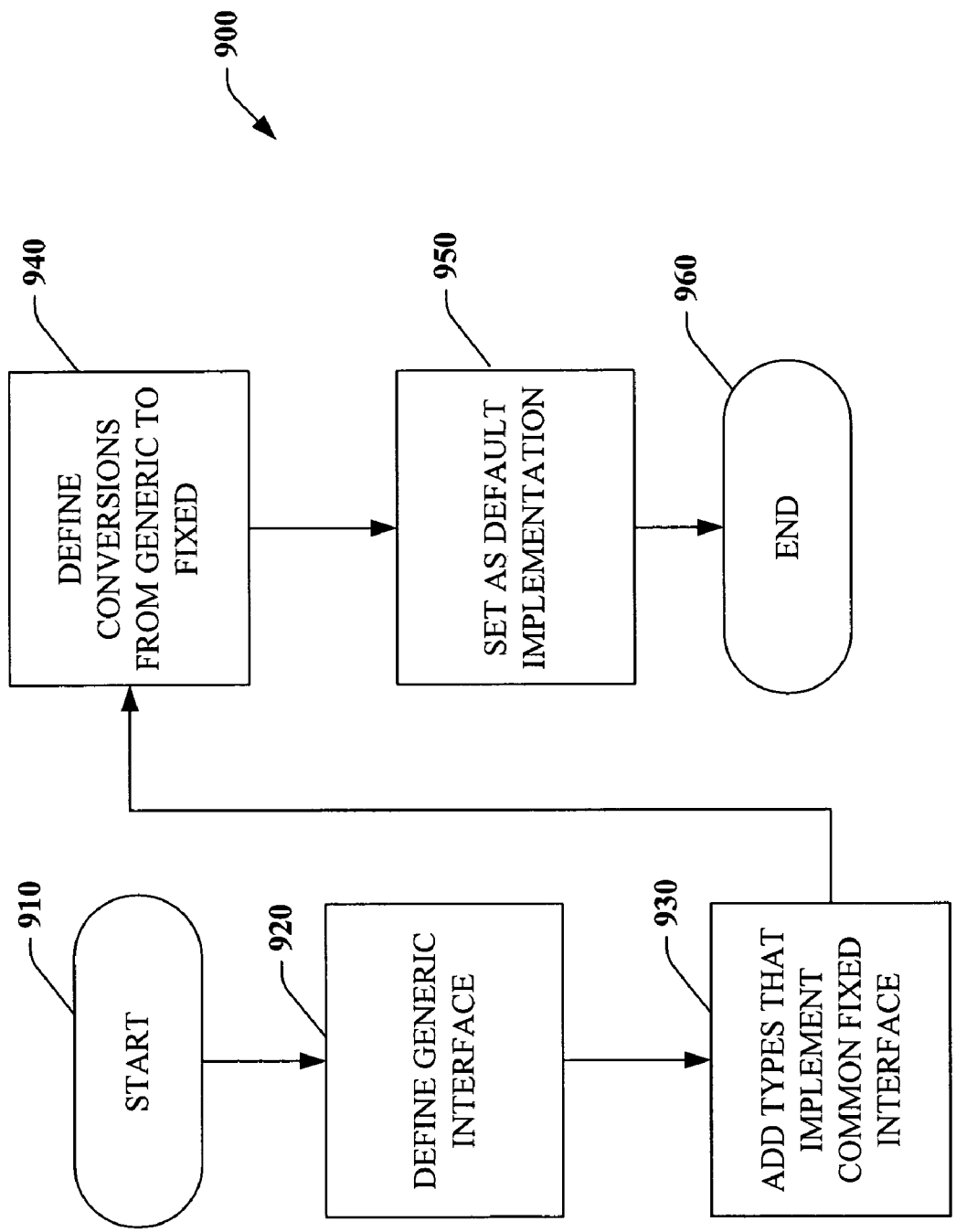
FIG. 9 is a flow diagram depicting a general processing flow of a method that can be employed in accordance with components that are disclosed and described herein.

FIG. 9 is a flow diagram of a method 900 that can be employed in conjunction with systems and components disclosed or described herein. The flow diagram depicts a method 900 of using a data interface. Specifically, the data interface can be imposed on a group of types to provide a strongly typed view.

Processing of the method 900 begins at START block 910 and continues to process block 920. At process block 920, a generic data interface, such as any of the data interfaces previously disclosed and described herein, is created. Processing continues to process block 930 where types that each implement a common fixed interface are added to the generic data interface. At process block 940, conversions from the generic data interface to the fixed interface implemented by each of the added types are defined. At process block 950, each of the defined conversions is set as a default implementation. Processing concludes at END block 960.

Figure 10:
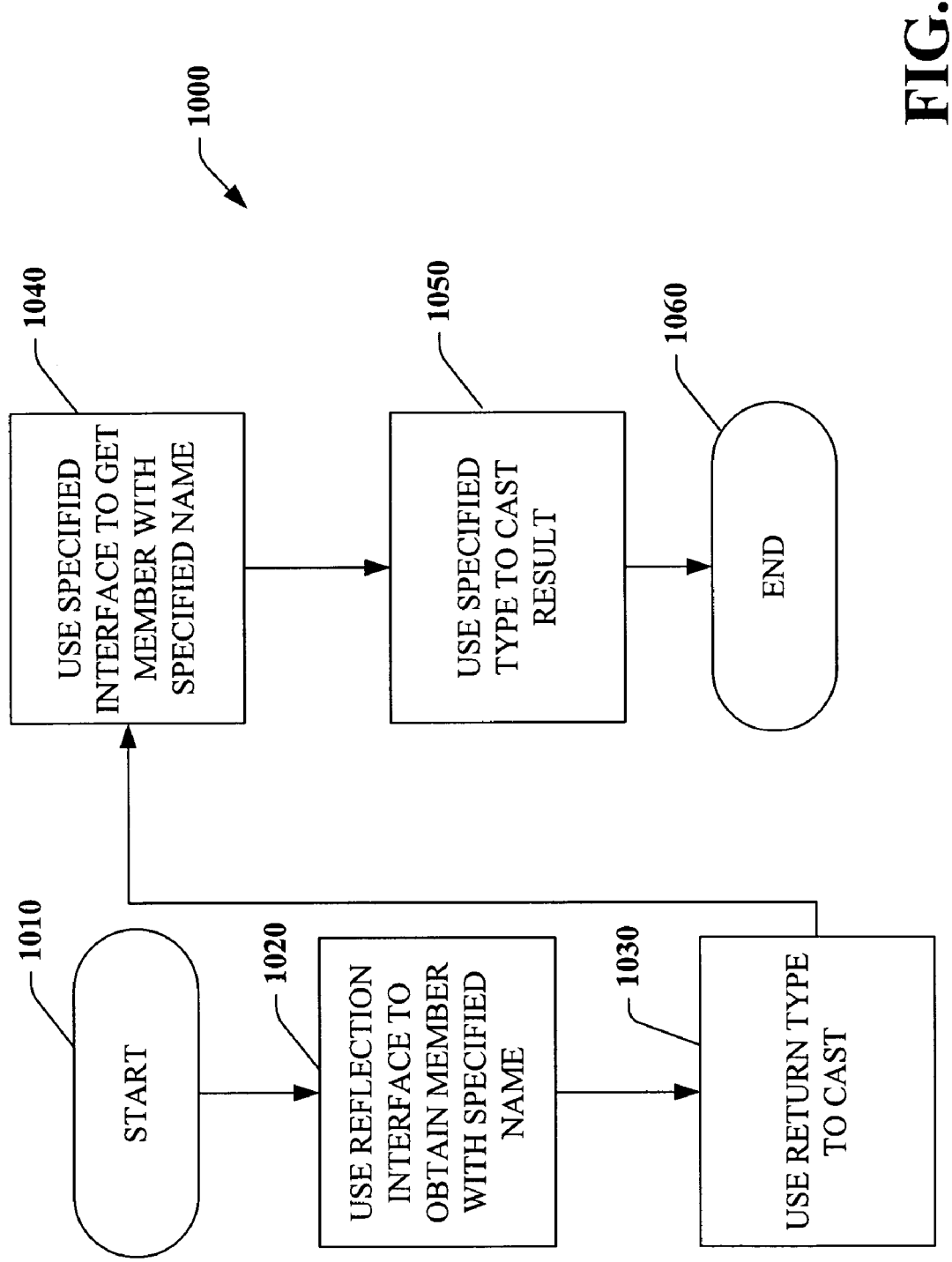
FIG. 10 is a flow diagram depicting a general processing flow of a method that can be employed in accordance with components that are disclosed and described herein.

FIG. 10 is a flow diagram of a method 1000 that can be employed in conjunction with systems and components disclosed or described herein. The flow diagram depicts a method 1000 of using a data interface. Specifically, the data interface can be used for providing a strongly typed view of untyped data in the manners discussed herein.

Processing of the method 1000 begins at START block 1010 and continues to process block 1020. At process block 1020, a reflection interface is used to obtain a member with a name specified by a signature. Processing continues to process block 1030 where a return type is used to cast a result of the reflection operation. At process block 1040, a specified interface is used to obtain a member with a specified name.

The method 1000 continues processing at process block 1050. At process block 1050, the specified type is used to typecast. Processing concludes at END block 1060.

Figure 11:
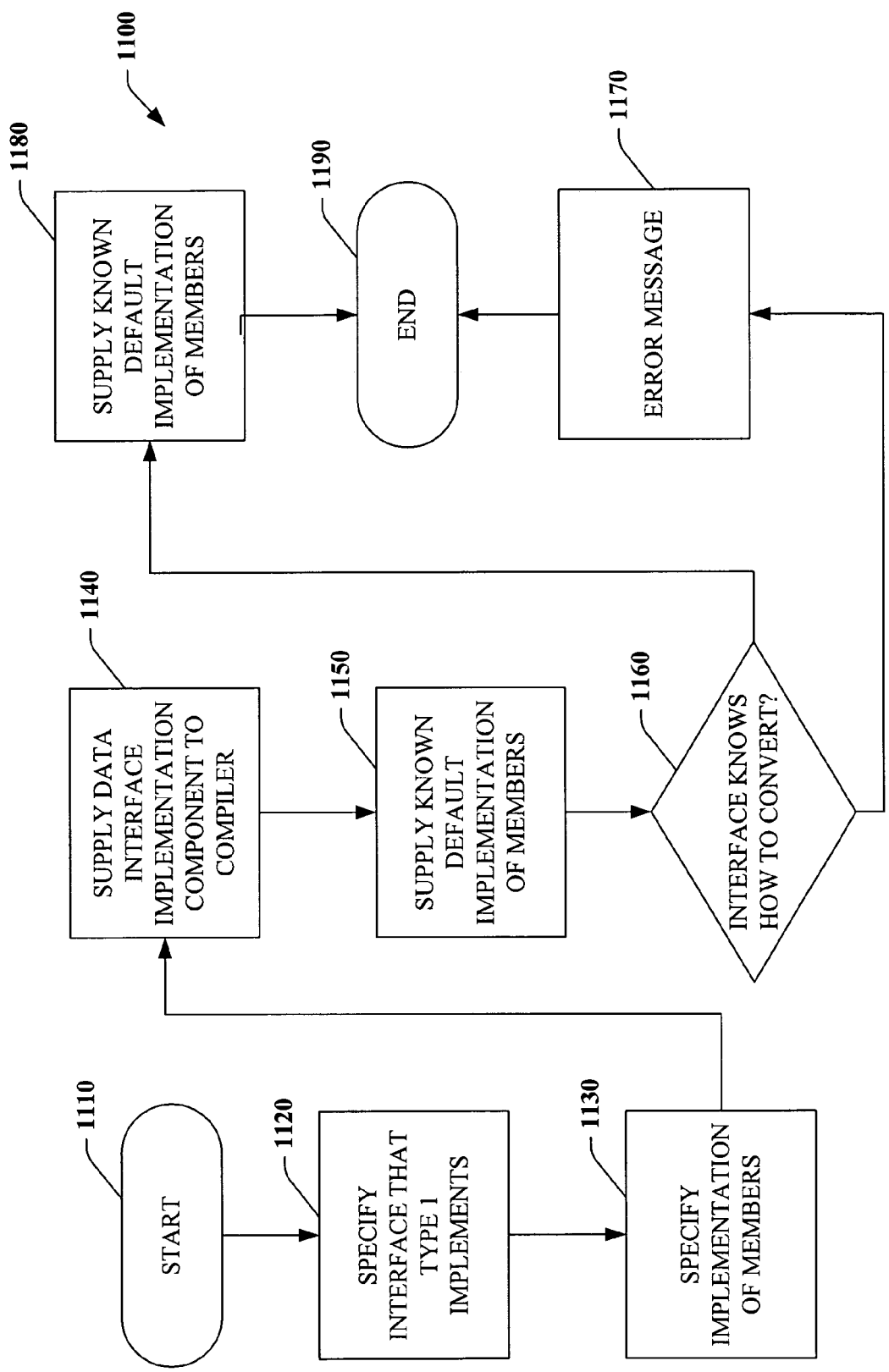
FIG. 11 is a flow diagram depicting a general processing flow of a method that can be employed in accordance with components that are disclosed and described herein.

FIG. 11 is a flow diagram of a method 1100 that can be employed in conjunction with systems and components disclosed or described herein. The flow diagram depicts a method 1100 of using a data interface. Specifically, the data interface can be used for providing a strongly typed view of untyped data in the manners discussed herein.

Processing of the method 1100 begins at START block 1110 and continues to process block 1120. At process block 1120, an interface that a first type T1 implements is specified. Processing continues to process block 1130 where an implementation of members is created. At process block 1140, a data interface implementation component is supplied to the compiler. Processing continues to process block 1150 where known default implementations of members are supplied.

The method 1100 continues processing at decision block 1160. At decision block 1160, determination is made whether a supplied interface provides sufficient information for a compiler to perform a desired conversion or typecast. If the determination made at decision block 1160 is no, an error message is created at process block 1170. If the determination made is yes, at process block 1180 the subject code is compiled. Processing of the method 1100 from either process block 1170 or process block 1180 concludes at END block 1190.

Figure 12:
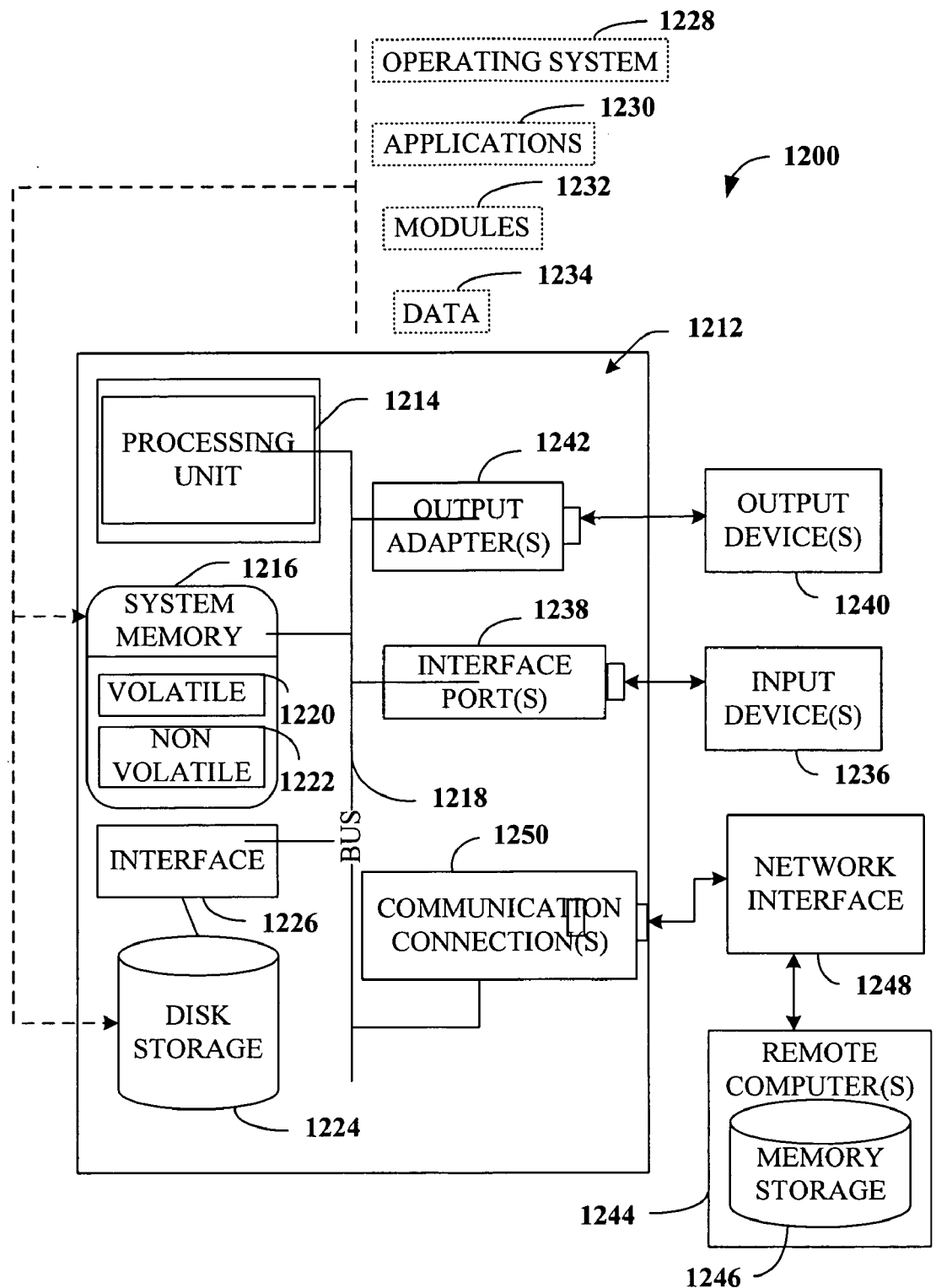
FIG. 12 illustrates an exemplary computing environment.
Figure 13:
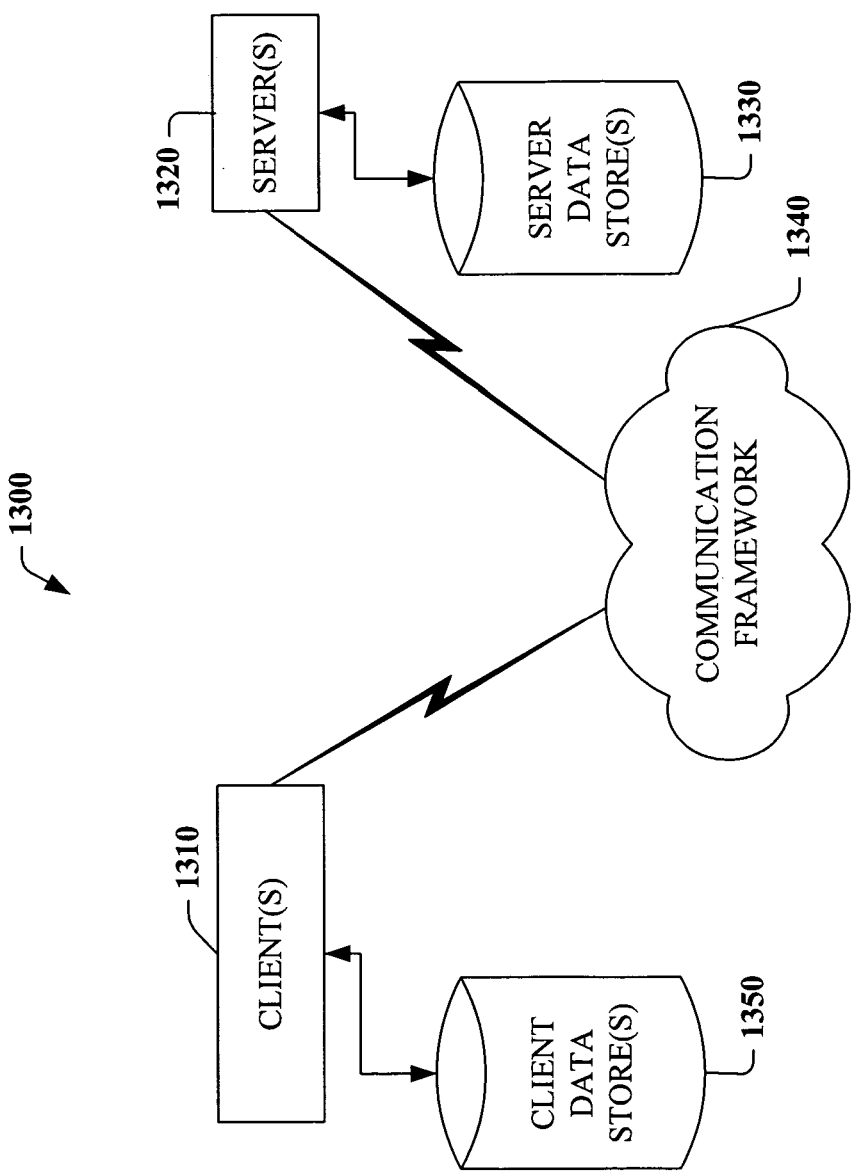
FIG. 13 illustrates an exemplary networking environment.

In order to provide additional context for implementation, FIGS. 12-13 and the following discussion is intended to provide a brief, general description of a suitable computing environment within which disclosed and described components and methods can be implemented. While various specific implementations have been described above in the general context of computer-executable instructions of a computer program that runs on a local computer and/or remote computer, those skilled in the art will recognize that other implementations are also possible either alone or in combination with other program modules. Generally, program modules include routines, programs, components, data structures, etc. that perform particular tasks and/or implement particular abstract data types.

Moreover, those skilled in the art will appreciate that the above-described components and methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. Certain illustrated aspects of the disclosed and described components and methods may also be practiced in distributed computing environments where certain tasks are performed by remote processing devices that are linked through a communications network or other data connection. However, some, if not all, of these aspects may be practiced on stand-alone computers. In a distributed computing environment, program modules may be located in local and/or remote memory storage devices.

With reference to FIG. 12, an exemplary environment 1200 for implementing various aspects of the invention includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable ROM (EEPROM), or flash memory. Volatile memory 1220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1212 also includes removable/non-removable, volatile/non-volatile computer storage media. For example, FIG. 12 illustrates a disk storage 1224. The disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in the suitable operating environment 1200. Such software includes an operating system 1228. The operating system 1228, which can be stored on the disk storage 1224, acts to control and allocate resources of the computer system 1212. System applications 1230 take advantage of the management of resources by operating system 1228 through program modules 1232 and program data 1234 stored either in system memory 1216 or on disk storage 1224.

It is to be appreciated that the subject invention can be implemented with various operating systems or combinations of operating systems.

A user enters commands or information into the computer 1212 through input device(s) 1236. The input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

FIG. 13 is a schematic block diagram of a sample-computing environment 1300 within which the disclosed and described components and methods can be used. The system 1300 includes one or more client(s) 1310. The client(s) 1310 can be hardware and/or software (for example, threads, processes, computing devices). The system 1300 also includes one or more server(s) 1320. The server(s) 1320 can be hardware and/or software (for example, threads, processes, computing devices). The server(s) 1320 can house threads or processes to perform transformations by employing the disclosed and described components or methods, for example.

One possible means of communication between a client 1310 and a server 1320 can be in the form of a data packet adapted to be transmitted between two or more computer processes. The system 1300 includes a communication framework 1340 that can be employed to facilitate communications between the client(s) 1310 and the server(s) 1320. The client(s) 1310 are operably connected to one or more client data store(s) 1350 that can be employed to store information local to the client(s) 1310. Similarly, the server(s) 1320 are operably connected to one or more server data store(s) 1330 that can be employed to store information local to the server(s) 1340.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A computer-implemented system for accessing data stored in a computer-readable format, comprising:

a processor;

system memory;

a data source indicator that identifies least one datum of a data source to be typed;

a type definition component that defines a strongly typed view of the at least one datum; and a generic data interface that is imposed on at least a plurality of different arbitrary data types, each arbitrary data type being added to the generic data interface by defining each of the plurality of different arbitrary data types in terms of a fixed, special or reflection interface, interface, a special wherein adding the arbitrary data types comprises converting from the generic interface to the arbitrary type according to the corresponding fixed, special or reflection interface, and wherein the generic data interface comprises at least an early-bound layer that informs how to access properties in a generic manner and a late-bound layer that informs how to access the strongly typed view of the at least one datum.

2. The system of claim 1, wherein the at least one datum is untyped.

3. The computer-implemented system of claim 2, further comprising a wrapper module that includes the data source indicator and the type definition component to couple the data source indicator with the type definition component.

4. The computer-implemented system of claim 3, further comprising a type conversion module that uses the wrapper module to strongly type the at least one untyped datum.

5. The computer-implemented system of claim 4, wherein the wrapper module provides a default implementation to strongly type the at least one untyped datum.

6. The computer-implemented system of claim 4, wherein the wrapper module provides a user-supplied implementation to strongly type the at least one untyped datum.

7. The computer-implemented system of claim 5, wherein the wrapper module is compositional.

8. The computer-implemented system of claim 6, wherein the wrapper module is compositional.

9. At a computer system including a processor and system memory, a computer-executable method for providing a strongly-typed view of an untyped datum, comprising:
creating a first interface component that obtains the untyped datum from an underlying data source; and
creating a second interface component that accesses the first interface component to assign a predefined type to the untyped datum, wherein the second interface component comprises a generic data interface that is imposed on the untyped datum, each untyped datum being added to the generic data interface by defining the untyped datum in terms of a fixed, special or reflection interface, wherein adding the untyped datum comprises converting from the generic interface to the untyped datum according to the corresponding fixed, special or reflection interface, and wherein the generic data interface comprises at least an early-bound layer that informs how to access properties in a generic manner and a late-bound layer that informs how to access the strongly typed view of the untyped datum.

10. The computer-executable method of claim 9, wherein creating a second interface component includes creating a member of the second interface component that defines a cast of a second, different datum to a desired type.

11. The computer-executable method of claim 10, further comprising using the second interface component to strongly type the untyped datum.

12. The computer-executable method of claim 11, wherein using the second interface component to strongly type the untyped datum includes compiling source code that refers to the untyped datum.

13. The computer-executable method of claim 12, wherein compiling source code includes erasing a type associated with the second interface component.

14. The computer-executable method of claim 9, wherein creating a second interface component includes at least one of supplying a default implementation for strongly typing the untyped datum and supplying a user-created implementation for strongly typing the untyped datum.

15. A computer-implemented system including a processor and system memory for providing a strongly-typed view of an untyped datum, comprising:
creating a first interface component that obtains the untyped datum from an underlying data source; and
creating a second interface component that accesses the first interface component to assign a predefined type to the untyped datum, wherein the second interface component comprises a generic data interface that is imposed on the untyped datum, each untyped datum being added to the generic data interface by defining the untyped datum in terms of a fixed, special or reflection interface, wherein adding the untyped datum comprises converting from the generic interface to the untyped datum according to the corresponding fixed, special or reflection interface, and wherein the generic data interface comprises at least an early-bound layer that informs how to access properties in a generic manner and a late-bound layer that informs how to access the strongly typed view of the untyped datum.

16. The computer-implemented system of claim 15, wherein creating the second interface component includes creating a member of the second interface component that defines a cast of a second, different datum to a desired type.

17. The computer-implemented system of claim 16, further comprising using the second interface component to strongly type the untyped datum.

18. The computer-implemented system of claim 17, wherein using the second interface component to strongly type the untyped datum includes compiling source code that refers to the untyped datum.

19. The computer-implemented system of claim 18, wherein compiling source code includes erasing a type associated with the second interface component.

20. The computer-implemented system of claim 15, wherein creating a second interface component includes at least one of supplying a default implementation for strongly typing the untyped datum and supplying a user-created implementation for strongly typing the untyped datum.

* * * * *

UNITED STATES PATENT AND TRADEMARK OFFICE
CERTIFICATE OF CORRECTION

| | |
|---|---|
| PATENT NO. | : 7,779,397 B2 |
| APPLICATION NO. | : 11/214404 |
| DATED | : August 17, 2010 |
| INVENTOR(S) | : Henricus Johannes Maria Meijer et al. |

It is certified that error appears in the above-identified patent and that said Letters Patent is hereby corrected as shown below:

In column 22, lines 61-62, in Claim 1, after "reflection interface," delete "interface, a special".

Signed and Sealed this
First Day of February, 2011

David J. Kappos
*Director of the United States Patent and Trademark Office*